United States Patent [19]

Jacques

[11] 3,925,482

[45] Dec. 9, 1975

[54] DISUBSTITUTED TOLANS AND PREPARATION THEREOF

[75] Inventor: Jean Jacques, Paris, France

[73] Assignee: Agence Nationale de Valorisation de la Recherche, Hauts de Seine, France

[22] Filed: June 1, 1972

[21] Appl. No.: 258,859

[30] Foreign Application Priority Data

June 2, 1971 France .............................. 71.19929
Nov. 19, 1971 France .............................. 71.41515

[52] U.S. Cl. ............ 260/612 R; 252/299; 252/300; 252/408; 260/613 R; 260/668 R; 350/160 LC
[51] Int. Cl.² .................... C07C 43/20; C07C 43/22
[58] Field of Search ........ 260/612 R, 613 A, 613 R, 260/613 D, 668 R

[56] References Cited
UNITED STATES PATENTS 3,742,067    6/1973    Sterger et al. .................. 260/613 A

OTHER PUBLICATIONS

Brown, "Analytical Chem.," Vol. 41, No. 13 pp. 26A–39A, (1969).
Matinite et al., "C.R. Acad. Sc. Paris," Series C, Vol. 273, pp. 265–267 (7-19-71).

Primary Examiner—Norman Morgenstern
Attorney, Agent, or Firm—Armstrong, Nikaido & Wegner

[57] ABSTRACT

Tolans are provided having the formula

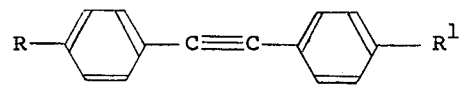

in which each of R and $R^1$ is an alkyl or alkoxy group, the sum of the number of carbon atoms in R and $R^1$ being at least 2 but less than 21, provided that when R and $R^1$ are both alkoxy or both alkyl the sum of the number of carbon atoms is at least 9 but less than 21 and further provided that each of R and $R^1$ has at least 1 but less than 11 carbon atoms. The tolans of the invention are useful as nematics in diverse fields such as thermometry, display and television. The tolans also are useful in forming birefringent plates with fixed or variable delay, as solvents for polarising filters and as anisotropic solvents, especially in optical spectroscopy and nuclear magnetic resonance.

17 Claims, No Drawings

DISUBSTITUTED TOLANS AND PREPARATION THEREOF

This invention relates to tolans, to their preparation and to certain mixtures thereof.

The interest which is now being shown in "liquid crystals" and the nematic phases in particular, is due to their application in the most diverse fields (thermometry, display and television). Numerous recent articles have reported the results achieved and the vistas opened up (see in particular: Phase Zero, No. 2, page 39 and Telonde 1971, page 1).

The factors which limit the possible uses of the nematics remain the generally high temperature of the mesomorphic region (nematics melting below 50°C are still exceptional), the chemical instability of products with satisfactory physical characteristics (Schiff's bases, for example, are very easily hydrolyzable), and finally the colour of numerous interesting substances.

One object of the present invention is to produce new substances which give rise to liquid crystals, which are stable and colourless and which have a very low vapour pressure. Another object is to provide substances of this type which, either in pure or admixed form, have mesomorphic properties at relatively low temperatures or even at ambient temperature.

According to the present invention there is provided a tolan having the general formula

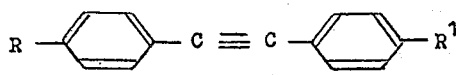

in which each of R and $R^1$ is an alkyl or alkoxy group, the sum of the number of carbon atoms in R and $R^1$ being at least 2, provided that when R and $R^1$ are both alkoxy or both alkyl the sum of the number of carbon atoms therein is at least 9, each of R and $R^1$ having from 1 to 10 carbon atoms.

The substances may therefore be symmetrical di-ethers, unsymmetrical di-ethers, unsymmetrical compounds which are p-alkyl-p'-alkoxytolans or symmetrical or unsymmetrical compounds which are p,p'-di-alkyltolans.

The symmetrical di-ethers are stable nematics when the radical R has more than 5 carbon atoms, but the transition temperatures from the crystalline state to the mesomorphic state are, in general, higher than 100°C; however, this temperature is 92°C for di-(para-n-octyloxy)tolan.

As for asymmetrical di-ethers, they demonstrate nematic properties when the total number of carbon atoms in R and $R^1$ is greater than 9. When the total number of carbon atoms is 10, 11 or 12, and the carbon chains in R and $R^1$ are straight, the transition points from the crystalline state to the mesomorphic state are grouped within the range of 80° to 100°C, the mesomorphic intervals being about 10° to 20°C.

Particularly interesting compounds are the p-alkyl-p'-alkoxytolans for which the total number of aliphatic carbon atoms exceeds 2, in particular those for which this number is 4 to 12. Amongst these, p-n-nonyl-p'-methoxytolan, p-n-octyl-p'-ethoxytolan, p-n-propyl-p'-n-heptyloxytolan, p-n-heptyl-p'-n-propoxytolan, p-methoxy-p'-n-pentyltolan and p-methoxy-p'-heptyltolan have transition points from the crystalline state to the mesomorphic state at temperatures lying between 40° and 50°C.

The p,p'di-alkyl-tolans do not, in general, possess a stable nematic character; however the mixtures obtained from these tolans and from tolans bearing at least one alkoxy group having 1 to 10 carbon atoms on one of the phenyl nuclei may have a stable nematic character at a temperature range lower than 50°C.

The invention includes mixtures of tolans such as defined above and, in particular, eutectic mixtures, which have the advantage of possessing a transition point from the solid to the mesomorphic state lower than that of the constituent which has the lower transition point, the transition temperature from the mesomorphic state to the liquid state being intermediate between those of the pure constituents Leaving aside certain conditions which will be mentioned below, it is possible to calculate the fusion temperature of a mixture of $n$ constituents and the composition of the eutectic mixture (minimum fusion temperature). The classical formula of Schroder - Van Laar $$\ln x = -\frac{\Delta H_F}{R}\left(\frac{1}{T_o} - \frac{1}{T}\right)$$

establishes a relation between the temperature $T_o$, the fusion enthalpy $\Delta H_F$ of a pure constituent and $x$ the molar fraction of this constituent in a mixture melting at a temperature $T$ ($R$ being the constant for a perfect gas).

The values ($\Delta H_F$) of the fusion enthalpies necessary for the calculation which follows are easily obtained, for example by calorimetry using commercially available apparatus.

The mixture with the lowest possible fusion point is that for which the sum of the molar fractions of all the constituents is equal to 1.

There will now be given, by way of example, the calculation of the composition and the fusion point of a binary mixture.

This calculation has been performed by a graphic method for the two compounds possessing the following characteristics.

|  | T | ΔH |
|---|---|---|
| a) 4-methoxy-4'-heptyltolan | 39° | 5.1K cal/mole |
| b) 4-ethoxy-4'-octyltolan | 47.5° | 4.1K cal/mol |

The theoretical phase diagram is established from the Schroder-Van Laar formula. This leads to the conclusion that the fusion temperature of the lowest melting mixture is 15°C for a composition consisting of 52% by weight of $a$ and 48% by weight of $b$. Experience shows that a mixture of this composition melts at 13°C and remains nematic up to 64°C. In the same way a ternary mixture can be obtained consisting of 40% by weight of p-octyl-p'-ethoxytolan
36% by weight of p-heptyl-p'-propoxytolan
24% by weight of p-nonyl-p'-methoxytolan melting at 20°C and remaining nematic up to 65°C.

The application of the foregoing method is no longer valid in cases in which the constituents of the mixture form solid solutions and addition compounds amongst themselves. In a general fashion, the departure of the behaviour of the constituents from the ideal thermodynamic behaviour may introduce a certain divergence between the calculated values and experimental results.

It is possible, according to the invention, to prepare the new tolans by dehydrohalogenation, accompanied by intramolecular rearrangement, from 1,1-diphenyl-2-halogenoethylenes having the general formula

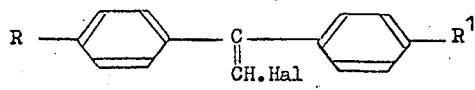

in which Hal signifies a halogen atom, more especially a bromine atom.

It is advantageous to carry out the fusion reaction of the 1,1-diphenyl halogeno-olefin with a tertiary-butylate of an alkali metal, more especially of potassium. The use of a diluent is not necessary.

Instead of beginning with the 2-halogeno compound, it is possible to begin with the crude halogenation product, in particular with the crude bromine addition product of the corresponding 1,1-diphenyl-ethylene without isolating the said halogenated compound.

The following examples illustrate the nature of the invention; the temperatures are all in degrees centigrade.

EXAMPLE 1 a. p-Ethoxy bromobenzene (general method described by Carter and Hey, Journal of the Chemical Society 1948, page 152)

A phenate solution is prepared in a 1 liter "rotavapor" flask from 200 ml of absolute ethanol, 4.6 g (0.2 M) of sodium and 34.6 g (0.2 M) of p-bromophenol. A solution of 17 ml (0.2M) of ethyl bromide in 25 ml of absolute ethanol is then added. The addition requires 30 minutes. It is then refluxed for one hour and 5 ml (0.05 M) of ethyl bromide dissolved in 5 ml of ethanol are added. Refluxing is continued for 3 hours during which sodium bromide precipitates.

After evaporation of the ethanol in the "rotavapor" 100 ml of water are added. The aqueous phase is extracted with ether. The ethereal phase is washed with water, then with dilute hydrochloric acid, then with salt water and dried over sodium sulfate.

After evaporation of the ether, the crude product is distilled. 35.5 g of p-etoxybromobenzene are collected. Bpt = 109°/16 m.m.

b. p-Octyloxyacetophenone.

7.9 g (0.05 M) of the phenate of p-hydroxyacetophenone, 14.2 g (0.05 M) of n-octyl tosylate and 100 ml of dimethylformamide are mixed. The mixture is heated at 110° on an oil-bath for 16 hours. Water is then added and the product extracted with ether. The ethereal phase is washed with 2N soda, water, dilute hydrochloride acid, and finally with salt water. After drying over sodium sulfate, the ether is evaporated and 12.4 g of crude product (theoretical quantity) is recovered. The ketone is distilled at low pressure. Bpt = 154°/1 m.m. 10 g are recovered; the yield is thus 81%. Instead of octyl tosylate, octyl bromide may also be used.

c. p-Ethoxy-p'-octyloxydiphenylethylene:

A magnesium compound is prepared from 0.15 g (0.006 M) of magnesium, 1.26 g (0.006 M) of p-ethoxybromobenzene and 5 ml of ether. To the magnesium compound is added 0.75 g (0.003 M) of p-octyloxyacetophenone in 10 ml of ether. This is allowed to reflux for 4 hours. The magnesium compound is hydrolyzed in an acid medium, the product extracted with ether, the ethereal phase washed with salt water and dried over sodium sulphate. After evaporation of the ether 1.5 g of crude crystalline product are recovered. The product is recrystallised from ethanol.

The 1-(p-ethoxyphenyl)-1-(p-octyloxyphenyl)ethylene

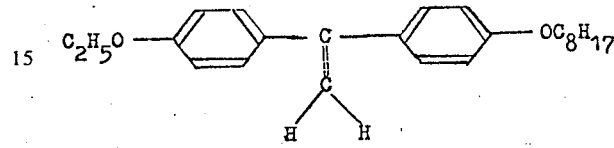

thus obtained melts at 108°.

d. p-Ethoxy-p'-octyloxytolan.

To a solution of 400 mg of p-ethoxy-p'-octyloxydiphenyl ethylene obtained as described in c in 30 ml of ether, bromine is added until the colour thereof persists. The ethereal solution is washed with N soda, water, dilute hydrochloric acid and salt water. After drying and evaporation of the ether, the residue is heated with 500 mg of dry potassium t-butylate at 120°–150° (oil bath) for 2 hours. The reaction mixture is treated with dilute hydrochloric acid and the aqueous phase is extracted with ether. After evaporation of the ether the recovered tolan is twice recrystallized from absolute alcohol. 240 mg are obtained.

The p-ethoxy-p'-octyloxytolan thus obtained

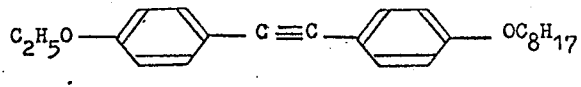

has a transition point at 91° for the change from the solid to the mesomorphic state and 113° for the change from the mesomorphic state to the liquid state.

Instead of brominating with bromine in an ethereal solution, it may also be done with phenyltrimethyl ammonium bromide (PTT) in tetrahydrofuran. As a general rule, the dibromide obtained (which may be a mixture of cis and trans isomers when the two benzene nuclei carry different groups) may be directly dehydrobrominated by a strong base (sodium amide, alcoholates, etc). This re-arrangement is known as the Fritsch-Buttenberg-Wiechell (1894) re-arrangement (see The Merck Index, 8th Edition (1968), page 1168, for recent references).

The conversion of the diphenylethylenes to the tolans, as has been seen under d, may be carried out without isolation of the product of the intermediate stages.

EXAMPLES 2 to 30

By proceeding as under b in Example 1 from the appropriate derivatives of 1,1-diphenyl-ethylene, the tolans are obtained which are identified in the following table by the different groups recorded for the symbols R and R' and the transition temperatures between crystalline forms ($C_1 \rightarrow C_2$) and ($C_2 \rightarrow C_3$) from the crystalline state to the mesomorphic state ($C_2 \rightarrow N$) and from the mesomorphic state to the liquid state ($N \rightarrow L$). The bracketed temperatures correspond to metastable transitions.

TABLE 1

| Ex No | R | R' | $C_1 \to C_2$ | $C_2 \to N$ | $N \to L$ |
|---|---|---|---|---|---|
| 1 | $C_2H_5O$ | $C_8H_{17}O$ | | 91° | 113° |
| 2 | $CH_3O$ | $nC_9H_{19}O$ | | 88,5° | [88°] |
| 3 | $nC_3H_7O$ | $nC_7H_{15}O$ | | 85° | 94° |
| 4 | $nC_4H_9O$ | $nC_6H_{13}O$ | | 102° | 112° |
| 5 | $nC_3H_7O$ | $nC_8H_{17}O$ | 78° | 85,5° | 101° |
| 6 | $CH_3O$ | $nC_{11}H_{23}O$ | | 91° | [85°] |
| 7 | $C_2H_5O$ | $nC_{10}H_{21}O$ | 76° | 85,5° | 108,5° |
| 8 | $nC_3H_7O$ | $nC_9H_{19}O$ | | 80° | 96° |
| 9 | $nC_4H_9O$ | $nC_8H_{17}O$ | 64° (spread) | 89° | 106,5° |
| 10 | $nC_5H_{11}O$ | $nC_7H_{15}O$ | 42° | 94° | 99° |
| 11 | $nC_5H_{11}O$ | $nC_5H_{11}O$ | | 106,5° | [106°] |
| 12 | $nC_6H_{13}O$ | $nC_6H_{13}O$ | 84° | 96° | 105° |
| 13 | $nC_8H_{17}O$ | $nC_8H_{17}O$ | 72° 77°($C_2 \to C_3$) | 92° | 101,5° |
| 14 | $nC_{10}H_{21}O$ | $nC_{10}H_{21}O$ | (2 smectic phases at 86.5° and 89°) | 95,5–101° | |
| 15 | $CH_3$ | $n-C_9H_{19}O$ | | 72;5° | |
| 16 | $CH_3O$ | $n-C_9H_{19}$ | | 41° | 53,5° |
| 17 | $n-C_3H_7$ | $n-C_6H_{13}O$ | | 59,5° | 75,5° |
| 18 | $C_2H_5O$ | $n-C_8H_{17}$ | | 47,5° | 73,5° |
| 19 | $n-C_3H_7$ | $N-C_7H_{15}O$ | | 48° | 70,5° |
| 20 | $n-C_3H_7O$ | $n-C_7H_{15}$ | | 41° | 63° |
| 21 | $n-C_4H_9O$ | $n-C_6H_{13}$ | | 46.5° | 69,5° |
| 22 | $n-C_5H_{11}O$ | $C_5H_{11}$ | | 48,5° | 68,5° |
| 23 | $CH_3O$ | $n-C_7H_{15}$ | | 39° | 54° |
| 24 | $CH_3O$ | $n-C_3H_7$ | | 64° | [60°] |
| 25 | $CH_3O$ | $n-C_4H_9$ | | no mesomorphic phase | 46° |
| 26 | $CH_3O$ | $n-C_5H_{11}$ | | 42° | 59° |
| 27 | $C_2H_5O$ | $n-C_3H_7$ | | 89° | 98° |
| 28 | $C_7H_{15}$ | $C_7H_{15}$ | | no mesomorphic phase | 39,5° |
| 29 | $CH_3O$ | $n-C_6H_{13}$ | | 39° | 42° |
| 30 | $n-C_8H_{17}O$ | $n-C_2H_5$ | | 76° | [65°] |

The diphenyl-ethylenes which can be used as starting materials are also new substances, which can be prepared as described in part c of Example 1; the melting point of those for which it has been possible to make the determination appear in the following table.

$C_2H_5O$—⟨⟩—Br  Bpt 109°/16 mm  Yield = 88%

$C_3H_7O$—⟨⟩—Br  Bpt 123–125°/20 mm  Yield = 78% (from $C_3H_7I$)

$C_4H_9O$—⟨⟩—Br  Bpt 145°/20 mm  Yield = 57% (from $C_4H_9Cl$)

$C_5H_{11}O$—⟨⟩—Br  Bpt 126°/20 mm  Yield = 90% (from $C_5H_{11}Br$)

TABLE II

| R | R' | Melting point |
|---|---|---|
| $CH_3O$ | $n-C_{11}H_{23}O$ | 107° |
| $CH_3O$ | $n-C_9H_{19}O$ | 105° |
| $C_2H_5O$ | $n-C_{10}H_{21}O$ | 110° |
| $C_2H_5O$ | $n-C_8H_{17}O$ | 108° |
| $n-C_3H_7O$ | $n-C_7H_{15}O$ | 103° |
| $n-C_4H_9O$ | $n-C_6H_{13}O$ | 106° |
| $n-C_5H_{11}O$ | $n-C_7H_{15}O$ | 102° |
| $n-C_5H_{11}O$ | $n-C_5H_{11}O$ | 116° |
| $n-C_8H_{17}O$ | $n-C_3H_7O$ | 104° |
| $n-C_7H_{15}O$ | $n-C_7H_{15}O$ | 108.5° |
| $n-C_{10}H_{21}O$ | $n-C_{10}H_{21}O$ | 106° |
| $CH_3$ | $n-C_9H_{19}O$ | 69° |
| $CH_3O$ | $n-C_9H_{19}$ | 45,5° |
| $C_2H_5O$ | $n-C_8H_{17}$ | 55,5° |
| $n-C_3H_7$ | $n-C_7H_{15}O$ | 50° |
| $n-C_4H_9O$ | $n-C_6H_{13}$ | 44° |
| $CH_3O$ | $n-C_3H_7$ | 46° |
| $CH_3O$ | $n-C_4H_9$ | <25° |
| $CH_3O$ | $n-C_5H_{11}$ | about 35° |
| $C_2H_5O$ | $n-C_3H_7$ | 67° |
| $C_2H_5$ | $n-C_8H_{17}O$ | 59° |
| $n-C_3H_7$ | $n-C_6H_{13}O$ | 48° |
| $n-C_3H_7O$ | $n-C_7H_{15}$ | 47° |

The p-alkyloxy-bromobenzenes used as starting materials are obtained by proceeding as indicated in part a of Example 1, using, if desired, an alkyl iodide or chloride instead of an alkyl bromide.

For those p-alkoxy-bromobenzenes which are new, there are appended the boiling points as well as the yield in their preparation.

The corresponding figures appear below for those of the alkoxy-actophenones which are new and which may be obtained as described in part b of Example 1.

$n-C_9H_{19}O$—⟨⟩—$CO.CH_3$  Mpt = 32°

$n-C_{10}H_{21}O$—⟨⟩—$CO.CH_3$  Mpt = 33.5°

$n-C_{11}H_{23}O$—⟨⟩—$CO.CH_3$  Mpt = 44°

Among the tolans described above in Table 1 the compounds possessing the lowest transition temperatures (T) from the crystalline to the mesomorphic state are the following:

TABLE III

| | |
|---|---|
| A — p-heptyl-p'-methoxytolan | T = 39° |
| B — p-heptyl-p'-propoxytolan | T = 41° |
| C — p-nonyl-p'-methoxytolan | T = 41° |
| D — p-pentyl-p'-methoxytolan | T = 43° |
| E — p-octyl-p'-ethoxytolan | T = 47.5° |
| F — p-pentyl-p'-pentyloxytolan | T = 48.5° |

The present invention also relates to mesomorphic mixtures which are mixtures of tolans. The most interesting mixtures are often binary mixtures of p-alkyl-p'-alkoxytolans amongst themselves or of p-alkyl-p'-alkoxytolans and p,p'-di-alkyltolans.

Particularly interesting mesomorphic mixtures are those enumerated below, the constituents (tolans listed above in table III) being preferably present in substantially equimolecular quantities:

| Mixture | Nematic over the range (inclusive of boundaries) |
|---|---|
| B + D | 0° – 59° |
| A + F | 7° – 57° |
| E + F | 10° – 70° |
| A + E | 13° – 64° |
| A + B | 15° – 53° |
| A + D | 17° – 54° |

A mixture obtained from a p-alkyl-p'alkoxytolan and a p,p'-di-alkyltolan, the constituents of which are not of a stable nematic character, and which is of a particularly interesting nature, is the following:

| Constituents | Range over which the mixture has a stable nematic character |
|---|---|
| p-butyl-p'-methoxytolan (Mpt = 46°) + p,p'-diheptyltolan (Mpt = 39.5°) | 15 – 35° |

The tolans described in the present application and their mixtures may be employed not only in the fields application in which liquid crystals are used but also in forming birefringent plates with fixed or variable delay, as solvents for polarising filters and as anisotropic solvents, especially in optical spectroscopy and nuclear magnetic resonance.

What I claim is:

1. A tolan of the formula

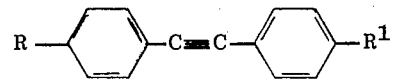

wherein R and R¹ are unlike alkoxy groups, wherein each of R and R¹ has at least 1 but less than 11 carbon atoms and the total number of the carbon atoms in R and R¹ is more than 9 and less than 13.

2. A tolan of the formula

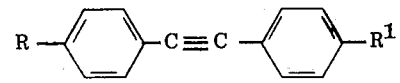

wherein R is an n-alkyl group and R¹ is an n-alkoxy group, wherein each of R and R¹ has at least 1 but less than 11 carbon atoms and the total number of the carbon atoms in R and R¹ is more than 3 but less than 13.

3. The compound of claim 2 of the formula

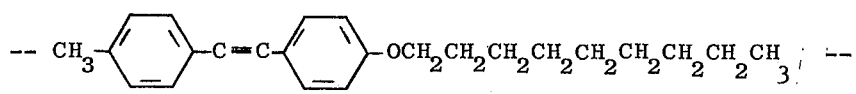

4. The compound of claim 2 of the formula

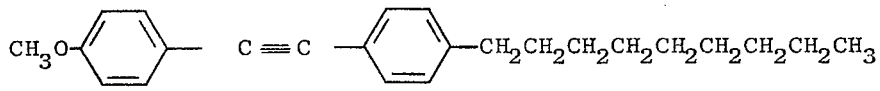

5. The compound of claim 2 of the formula

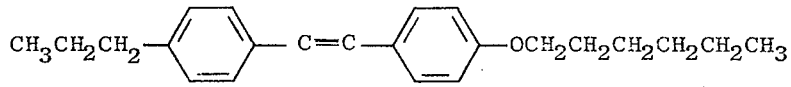

6. The compound of claim 2 of the formula

7. The compound of claim 2 of the formula

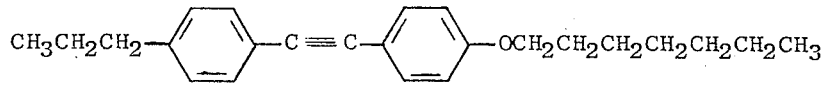

8. The compound of claim 2 of the formula

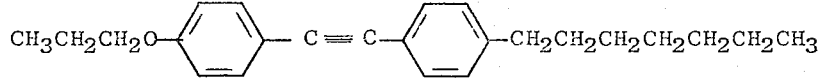

9. The compound of claim 2 of the formula

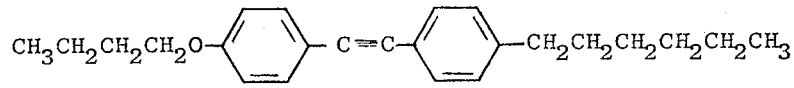

10. The compound of claim 2 of the formula

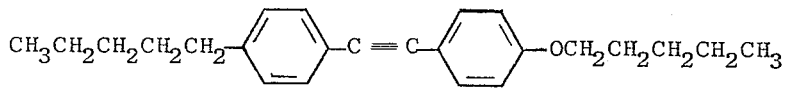
11. The compound of claim 2 of the formula
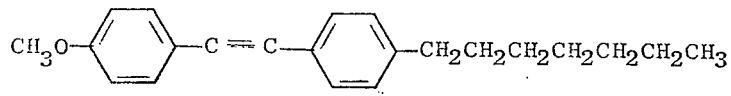
12. The compound of claim 2 of the formula
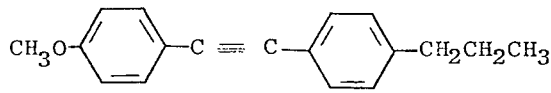
13. The compound of claim 2 of the formula
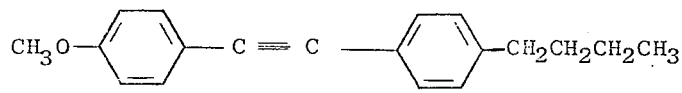
14. The compound of claim 2 of the formula
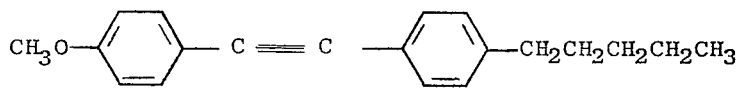
15. The compound of claim 2 of the formula
16. The compound of claim 2 of the formula
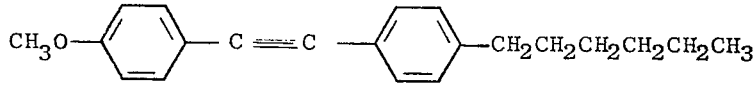
17. The compound of claim 2 of the formula
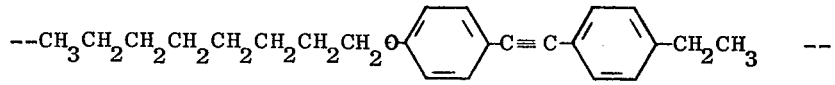
* * * * *